US009826145B2

(12) United States Patent
Malgimani et al.

(10) Patent No.: US 9,826,145 B2
(45) Date of Patent: Nov. 21, 2017

(54) METHOD AND SYSTEM TO ASSIST A USER TO CAPTURE AN IMAGE OR VIDEO

(71) Applicant: SONY CORPORATION, Tokyo (JP)

(72) Inventors: Syed Inayathulla Nazerulla Malgimani, Bangalore (IN); Madhvesh Sulibhavi, Bangalore (IN); Pramod Chintalapoodi, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/814,875

(22) Filed: Jul. 31, 2015

(65) Prior Publication Data
US 2017/0034431 A1 Feb. 2, 2017

(51) Int. Cl.
*H04N 5/232* (2006.01)
*G06F 17/30* (2006.01)

(52) U.S. Cl.
CPC ..... *H04N 5/23222* (2013.01); *H04N 5/23293* (2013.01); *G06F 17/30265* (2013.01)

(58) Field of Classification Search
CPC ............ H04N 5/23222; H04N 5/23293; G06F 17/30265
See application file for complete search history.

(56) References Cited

U.S. PATENT DOCUMENTS

| 6,606,117 | B1 | 8/2003 | Windle | |
| 2014/0022433 | A1* | 1/2014 | Glennie | ............ H04N 5/23212 |
| | | | | 348/333.02 |
| 2014/0247325 | A1 | 9/2014 | Wu et al. | |
| 2015/0098000 | A1* | 4/2015 | Gosangi | ............ H04N 5/23222 |
| | | | | 348/333.02 |

* cited by examiner

*Primary Examiner* — Ahmed A Berhan
(74) *Attorney, Agent, or Firm* — Chip Law Group

(57) ABSTRACT

Various aspects of a method and system to assist a user in the capture of an image or video are disclosed herein. In accordance with an embodiment, one or more circuits in an electronic device are configured to receive a first plurality of input values from the user. The first plurality of input values comprise a first plurality of boundary points that encompass a first object in one or more fields-of-view (FOVs) of the electronic device at the first location. Thereafter, a second location and a target FOV, which is used to capture the image or video, is determined based on the first plurality of boundary points. The image or video comprises at least the first object. Further, display of an indicator is controlled to guide the user to the second location to capture the image or video in the target FOV.

24 Claims, 9 Drawing Sheets

METHOD AND SYSTEM TO ASSIST A USER TO CAPTURE AN IMAGE OR VIDEO

FIELD

Various embodiments of the disclosure relate to image capture. More specifically, various embodiments of the disclosure relate to device-based assistance to a user to capture an image or video.

BACKGROUND

With the advancements in image-processing technology and the proliferation of camera-enabled electronic devices, there has been significant growth in the number of photography enthusiasts that include both amateur and professional photographers. Professional photographers may take due care when they pick a spot to shoot an image or video of a scene. They may have knowledge of various adjustments and settings that may be available in their electronic device that enable a user to capture a suitable shot. Further, they may be aware of various post-processing operations that can be performed on a captured image or video to enhance its quality. However, amateur photographers may not be as aware and well-informed with respect to the subtleties involved in photography as are professional photographers. Hence, there exists a need to assist such novice or amateur users in the capture of images or videos with optimal quality.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to assist a user to capture an image or video substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
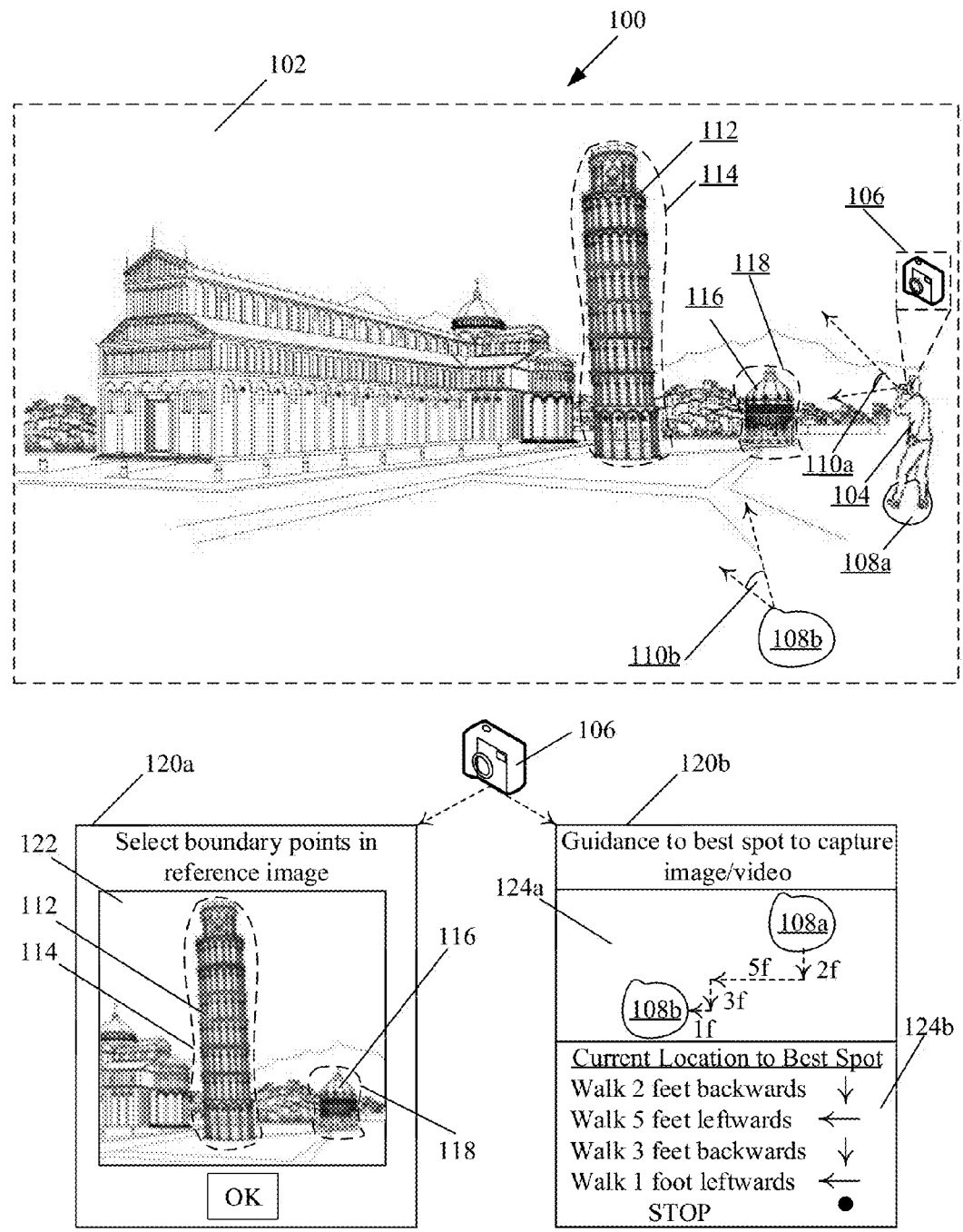
FIG. 1 illustrates an exemplary environment to assist a user to capture an image or video, in accordance with an embodiment of the disclosure.

The following described implementations may be found in the disclosed method and system to assist a user in the capture of an image or video. Exemplary aspects of the disclosure may include a method implementable in an electronic device. The method may include the reception of a first plurality of input values from the user at a first location. The received first plurality of input values may comprise a first plurality of boundary points that encompass a first object in one or more fields-of-view (FOVs) of the electronic device at the first location. Thereafter, a second location and a target FOV to capture the image or video may be determined, based on the received first plurality of boundary points. The image or video may comprise at least the first object. Further, display of an indicator may be controlled to guide the user to the second location to capture the image or video of the first object in the target FOV.

In accordance with an embodiment, at least a portion of the first object may extend beyond the one or more FOVs of the electronic device at the first location. The second location and the target FOV may be determined based on a user-defined threshold value to capture a portion of the first object in the target FOV.

In accordance with an embodiment, sensor data may be received from one or more sensors of the electronic device to determine the first plurality of boundary points that may encompass the first object. The second location and the target FOV may be determined based on the determination of one or more parameters. Examples of the one or more parameters may include, but are not limited to, a direction of light, one or more sources of light, an intensity of light, an angle of movement of the electronic device when the first object is viewed in the one or more FOVs, a distance of the first object from the electronic device at the first location, and/or an image quality threshold value.

A second plurality of input values may be received from the user at the first location. The received second plurality of input values may comprise a second plurality of boundary points that may encompass a second object. In accordance with an embodiment, a panoramic-image mode may be recommended for capture of the first object and the second object. In accordance with an embodiment, the second location and the target FOV may be determined to capture an image or video that comprises the first object and the second object. The determination of the second location and the target FOV may be based on the received first plurality of boundary points for the first object and the received second plurality of boundary points for the second object.

In accordance with an embodiment, a threshold value to capture a portion of the first object and/or the second object in the target FOV may be indicated. In accordance with an embodiment, the first and/or the second object may be in motion. A video that comprises the first object and the second object may be captured when the first object and/or the second object are in motion.

A recommendation for use of one or more setting parameters to capture the image or video of the first object at the determined second location in the target FOV may be determined. Examples of the one or more setting parameters may include, but are not limited to, aperture setting, International Organization for Standardization (ISO) sensitivity, auto-exposure, auto-focus, auto-white-balance, and/or auto-illumination.

FIG. 1 illustrates an exemplary environment to assist a user to capture an image or video, in accordance with an embodiment of the disclosure. With reference to FIG. 1, there is shown an exemplary environment 100. The exemplary environment 100 may include a scene-of-interest 102, a user 104, and an electronic device 106. The exemplary environment 100 may further include locations, such as a first location 108a and a second location 108b, associated with the position of the user 104 at different time-points. The exemplary environment 100 may further include fields-of-view (FOVs), such as a first FOV 110a and a second FOV 110b, of the electronic device 106, at the first location 108a and the second location 108b, respectively. The exemplary environment 100 may . . . include a first portion 124a and a second portion 124b to display indicators, such as navigation directions, to provide guidance to the user 104.

The scene-of-interest 102 may comprise a geographical area or landscape in which the user 104 may be interested to capture as an image or video by use of the electronic device 106. The captured image or video may include a representation of one or more objects that may be located within the geographical area or landscape. Examples of the one or more objects may include, but are not limited to, buildings, architectural artefacts, roads, water-bodies, vehicles, human subjects, and/or non-human subjects.

The user 104 may correspond to a human subject who may capture an image or video of the one or more objects in the geographical area or landscape. In accordance with an embodiment, the user 104 may use the electronic device 106 to capture the image or video while the user 104 is located near or within the geographical area. In accordance with an embodiment, while the user 104 captures the image or video, the user 104 may provide a plurality of input values to the electronic device 106, via the first UI 120a. Based on the plurality of input values, the electronic device 106 may display a recommendation to the user 104 via the second UI 120b, to assist the user 104 in the capture of the image or video.

A person with ordinary skill in the art will understand that the scope of the disclosure should not be limited to the user 104 as a human subject. In accordance with an embodiment, the user 104 may correspond to an automated image-capturing device such as, but not limited to, an image-capturing robot, an image-capturing drone, a spider-camera, and/or a surveillance-camera. In such cases, the functionalities of the electronic device 106 may be performed by the automated image-capturing device. Alternatively, the automated image-capturing device may be communicatively coupled to another electronic device or a server that may be configured to assist the automated image-capturing device in the capture of the image or video.

The electronic device 106 may comprise suitable logic, circuitry, interfaces, and/or code that may be configured to assist the user 104 in the capture of an image or video. In accordance with an embodiment, the electronic device 106 may be configured to receive a plurality of input values from the user 104, via the first UI 120a of the electronic device 106. Further, based on the plurality of input values, the electronic device 106 may display a recommendation to the user 104, via the second UI 120b, to assist the user 104 in the capture of the image or video. In accordance with an embodiment, the user 104 may use the electronic device 106 to capture the image or video, based on the recommendation provided by the electronic device 106. Examples of the electronic device 106 may include, but are not limited to, a smartphone, a camera, a tablet computer, a laptop, a wearable electronic device, a smart glass, a digital camcorder, and/or other such camera-enabled device.

In operation, the user 104 may desire to capture an image or video of the first object 112 from an initial location, such as the first location 108a, by use of the electronic device 106. The first location 108a may correspond to a position of the user 104 in the same geographical area where the first object 112 is located. The first object 112 may be viewed within one or more FOVs, such as a first FOV 110a, of the electronic device 106 at the first location 108a. In accordance with an embodiment, at least a portion of the first object 112 may extend beyond the first FOV 110a of the electronic device 106 at the first location 108a. The electronic device 106 may be configured to receive a first plurality of input values from the user 104 at the first location 108a. The received first plurality of input values may comprise a first plurality of boundary points, such as the boundary points 114. The first plurality of boundary points 114 may encompass the first object 112. In accordance with an embodiment, the electronic device 106 may be configured to determine the first plurality of boundary points 114, based on the sensor data generated by one or more sensors in the electronic device 106.

In accordance with an embodiment, the electronic device 106 may be configured to determine a target location, such as the second location 108b, and a target FOV, such as the second FOV 110b, based on the determination of one or more parameters. Examples of the one or more parameters may include, but are not limited to, a direction of light, one or more sources of light, an intensity of light, an angle of movement of the electronic device 106 when the first object 112 is viewed in the first FOV 110a, a distance of the first object 112 from the electronic device 106 at the first location 108a, and/or a pre-determined image quality threshold value. An image or video of at least the first object 112, captured from the second location 108b and within the second FOV 110b, may correspond to final image or video that may be captured by the electronic device 106. The determination of the second location 108b and the second FOV 110b may be based on the received first plurality of boundary points 114. In accordance with an embodiment, the second location 108b and the second FOV 110b may be determined, based on a user defined threshold value to capture a portion of the first object 112 in the second FOV 110b. The electronic device 106 may be further configured to control display of an indicator. The indicator may guide the user 104 to the second location 108b, to capture the final image or video of the first object 112 in the second FOV 110b in an optimal manner.

In accordance with an embodiment, the electronic device 106 may be further configured to receive a second plurality of input values from the user 104, via the first UI 120a, at the first location 108a. The second plurality of input values may comprise a second plurality of boundary points, such as the boundary points 118, which may encompass the second object 116. In accordance with an embodiment, the second location 108b and the second FOV 110b may be determined to capture an image or video that comprise both the first object 112 and the second object 116. The determination may be based on the received first plurality of boundary points 114 for the first object 112, and the received second plurality of boundary points 118 for the second object 116.

For example, the user 104 may use the electronic device 106 to capture the reference image 122 of the scene-of-interest 102 at the initial location of the user 104, such as the first location 108*a*. The electronic device 106 may display the captured reference image 122 to the user 104, via the first UI 120*a*. Further, the electronic device 106 may prompt the user 104 to provide input to select a plurality of boundary points in the reference image 122, via the first UI 120*a*. The user 104 may provide the first plurality of input values to select the first plurality of boundary points 114 that may encompass the first object 112, via the first UI 120*a*. In addition, the user 104 may provide another input (such as the second plurality of input values) to select the second plurality of boundary points 118 that may encompass the second object 116, via the first UI 120*a*. Thereafter, the electronic device 106 may determine the target location (such as the second location 108*b*) to capture a final image or video that encompasses the first object 112 and the second object 116, based on the plurality of boundary points 114 and 118. The electronic device 106 may display the second UI 120*b* to the user 104, to assist the user 104 to find the second location 108*b* from the first location 108*a*. The second UI 120*b* may display a recommendation of one or more paths to reach the second location 108*b* from the first location 108*a*. Examples of the recommendation may include, but are not limited to, visual directions, textual directions, and/or audio directions to reach the second location 108*b*. For instance, the second UI 120*b* may include the first portion 124*a* to display a visual navigation map to reach the second location 108*b* from the first location 108*a*. Further, the second UI 120*b* may include the second portion 124*b* to display corresponding textual navigation directions, such as "walk 2 feet backwards", "walk 5 feet leftwards", "walk 3 feet backwards", and "walk 1 foot leftwards". A person having ordinary skill in the art will understand that the first UI 120*a* and the second UI 120*b* are provided for illustrative purposes and should not be construed to limit the scope of the disclosure.

In accordance with an embodiment, the electronic device 106 may be configured to indicate a threshold value to the user 104, via the first UI 120*a*. The threshold value may enable the capture of an image or video that may include a portion of the first object 112 and/or the second object 116 in the second FOV 110*b*. In accordance with an embodiment, the first object 112 and/or the second object 116 may be in motion. The electronic device 106 may recommend capture of video that comprises the first object 112 and the second object 116, when the first object 112 and/or the second object 116 is/are in motion. Alternatively (or in addition to the above), the electronic device 106 may recommend capture of the first object 112 and the second object 116 in a panoramic-image mode of the electronic device 106.

In accordance with an embodiment, the electronic device 106 may be further configured to determine a recommendation for use of one or more setting parameters. The determined setting parameters may be used to capture the image or video of the first object 112 at the determined second location 108*b* in the second FOV 110*b*. The electronic device 106 may provide the determined recommendation to the user 104, via the second UI 120*b* of the electronic device 106. Examples of the one or more setting parameters may include, but are not limited to, aperture setting, International Organization for Standardization (ISO) sensitivity, auto-exposure, auto-focus, auto-white-balance, and/or auto-illumination.

Figure 2:
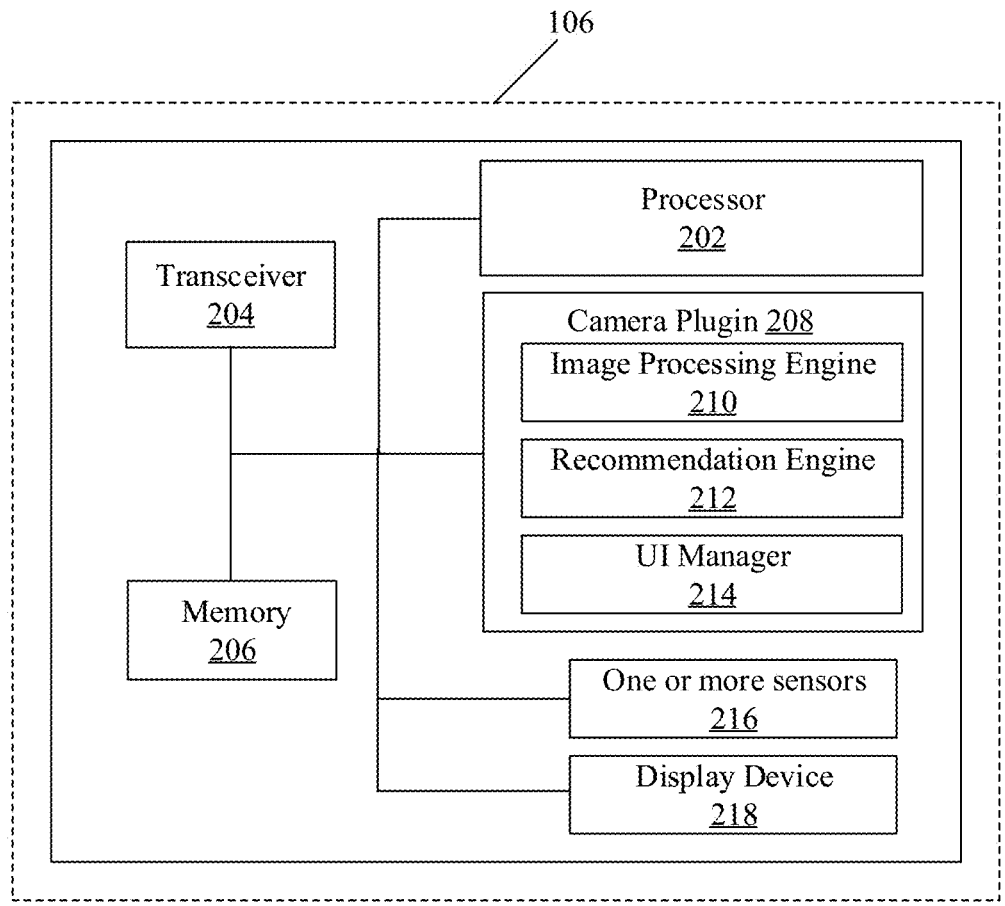
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 106. The electronic device 106 may comprise one or more processors, such as a processor 202, one or more transceivers, such as a transceiver 204, one or more memories, such as a memory 206, a camera plugin 208, one or more sensors 216, and a display device 218. The camera plugin 208 may include an image-processing engine 210, a recommendation engine 212, and a UI manager 214. In accordance with an embodiment, the electronic device 106 may be communicatively coupled to one or more other electronic devices or servers, through a communication network (not shown in FIG. 2), via the transceiver 204. Alternatively, the electronic device 106 may not include the transceiver 204. In such a case, the electronic device 106 may not be enabled to communicate with one or more other electronic devices or servers.

The processor 202 may be communicatively coupled to the transceiver 204, the memory 206, the camera plugin 208, the one or more sensors 216, and the display device 218. The transceiver 204 may be configured to communicate with another electronic device or a server (not shown), via a communication network (not shown).

The processor 202 may comprise suitable logic, circuitry, interfaces, and/or code that may be configured to execute a set of instructions stored in the memory 206. The processor 202 may be implemented, based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The transceiver 204 may comprise suitable logic, circuitry, interfaces, and/or code that may be configured to communicate with another electronic device or a server (not shown), via a communication network (not shown). The transceiver 204 may implement known technologies to support wired or wireless communication. The transceiver 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 204 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The memory 206 may comprise suitable logic, circuitry, and/or interfaces that may be configured to store a machine code and/or a computer program with at least one code section executable by the processor 202. The memory 206 may be further configured to store one or more images or videos that may be captured by the electronic device 106. In accordance with an embodiment, the memory 206 may comprise discrete memory partitions. In such a case, various camera plugins, such as the camera plugin 208, may have a direct exclusive access to the corresponding memory partition, barring other applications or programs installed on the electronic device 106. Examples of implementation of the memory 206 may include, but are not limited to, Random Access Memory (RAM), Read Only Memory (ROM), Hard Disk Drive (HDD), and/or a Secure Digital (SD) card.

The camera plugin 208 may comprise suitable logic, circuitry, interfaces, and/or code that may be configured to provide assistance to the user 104 to capture one or more images or videos, by use of the electronic device 106. In accordance with an embodiment, the camera plugin 208 may be a part of the processor 202. Alternatively, the camera plugin 208 may be implemented as a separate processor or circuitry in the electronic device 106. In accordance with an embodiment, the camera plugin 208 and the processor 202 may be implemented as an integrated processor or a cluster of processors that perform the functions of the camera plugin 208 and the processor 202. In accordance with an embodiment, the camera plugin 208 may be implemented as a computer program code, stored in the memory 206, which on execution by the processor 202 may perform the functions of the camera plugin 208.

The image-processing engine 210 may comprise suitable logic, circuitry, interfaces, and/or code that may be configured to determine a target FOV of the electronic device 106 within the geographical area of the scene-of-interest 102. Further, the image-processing engine 210 may be configured to determine a target location within the geographical area, which may enable capture of the final image or video in the determined FOV of the electronic device 106. In accordance with an embodiment, the image-processing engine 210 may receive sensor data from the one or more sensors 216. Based on the sensor data, the image-processing engine 210 may determine one or more parameters. The image-processing engine 210 may be configured to determine the target FOV and location, based on the determined one or more parameters.

The recommendation engine 212 may comprise suitable logic, circuitry, interfaces, and/or code that may be configured to generate one or more recommendations to capture the final image or video, based on the target FOV and/or the target location. The recommendation engine 212 may receive sensor data, which may include a current location of the user 104 (that may be same as that of the electronic device 106), from the one or more sensors 216. Thereafter, the recommendation engine 212 may generate the one or more recommendations to assist the user 104 to find the target location determined by the image-processing engine 210, based on the current location of the user 104. In accordance with an embodiment, the recommendation engine 212 may generate a recommendation of one or more setting parameters to capture the image or video of an object at the target location in the target FOV. A person with ordinary skill in the art will understand that the scope of the disclosure should not be limited to the implementation of the image-processing engine 210 and the recommendation engine 212 as separate entities. In accordance with an embodiment, the image-processing engine 210 and the recommendation engine 212 may be integrated as a single entity, without deviation from the scope of the disclosure.

The UI manager 214 may comprise suitable logic, circuitry, interfaces, and/or code that may be configured to manage a UI presented on the display device 218 of the electronic device 106. The UI manager 214 may be further configured to receive and process user input received through the first UI 120a of the electronic device 106, via an input device (not shown in FIG. 2) of the electronic device 106. In accordance with an embodiment, the input device may be communicatively coupled to (or included within) the electronic device 106. Examples of the input device may include, but are not limited to, a keypad, a mouse, a joy stick, a track pad, a voice-enabled input device, a touch-enabled input device, and/or a gesture-enabled input device.

In accordance with an embodiment, the UI manager 214 may be configured to present a camera interface to the user 104, via the UI of the electronic device 106 (hereinafter, the terms "UI" and "camera interface" are used interchangeably). The camera interface may be configured to display the one or more recommendations, for capture of final image or video, that are generated by the recommendation engine 212. Further, the camera interface may be configured to enable the user 104 to capture the final image or video based on the one or more recommendations.

The one or more sensors 216 may comprise suitable logic, circuitry, interfaces, and/or code that may be configured to capture one or more images or videos of the scene-of-interest 102. In accordance with an embodiment, the one or more sensors 216 may be configured to determine a location, an orientation, and/or a degree of movement of the electronic device 106, with respect to the one or more objects in the geographical area of the scene-of-interest 102. Further, the one or more sensors 216 may be configured to determine sensor data, based on one or more of the determined location, the determined orientation, and/or the determined degree of movement of the electronic device 106. The one or more sensors 216 may include an image-capturing sensor and/or a light sensor. Examples of the image-capturing sensor and/or light sensor may include, but are not limited to, a charge coupled device (CCD) sensor, a complementary metal-oxide semiconductor (CMOS) sensor, and/or an N-type metal-oxide-semiconductor (NMOS) sensor. In addition, the one or more sensors 216 may also include, but are not limited to, a location sensor (such as a geographic positioning sensor (GPS)), an orientation sensor (such as a gyroscope and/or a magnetometer), and/or a velocity/motion sensor (such as an accelerometer).

The display device 218 may comprise suitable logic, circuitry, interfaces, and/or code that may be configured to render the first UI 120a and the second UI 120b. In accordance with an embodiment, the display device 218 may be implemented as a part of the electronic device 106. Alternatively, the display device 218 may be communicatively coupled to the electronic device 106. The display device 218 may be realized through several known technologies such as, but not limited to, Cathode Ray Tube (CRT) based display, Liquid Crystal Display (LCD), Light Emitting Diode (LED) based display, Organic LED display technology, and Retina display technology. In addition, in accordance with an embodiment, the display device 218 may receive input from the user 104. In such a case, the display device 218 may be a touch screen that may enable the user 104 to provide the input. In accordance with an embodiment, the touch screen may correspond to at least one of a resistive touch screen, a capacitive touch screen, or a thermal touch screen. In accordance with an embodiment, the display device 218 may receive the input through a virtual keypad, a stylus, a gesture-based input, and/or a touch-based input.

In such a case, the input device may be integrated within the display device 218. In addition, the electronic device 106 may include a secondary input device apart from a touch-screen-based display device 218.

In operation, the user 104 may desire to capture an image or video of the first object 112 from an initial location, such as the first location 108a, by use of the electronic device 106. The first object 112 may be viewed within one or more FOVs, such as a first FOV 110a, of the electronic device 106 at the first location 108a. In accordance with an embodiment, at least a portion of the first object 112 may extend beyond the first FOV 110a of the electronic device 106 at the first location 108a. The UI manager 214 may be configured to display the captured reference images or videos to the user 104, via the UI of the electronic device 106 (for instance, via the first UI 120a). Further, the UI manager 214 may prompt the user 104 to provide a plurality of input values, based on the captured reference images or videos.

In accordance with an embodiment, the image-processing engine 210 may be configured to receive a first plurality of input values from the user 104, via the first UI 120a of the electronic device 106. The first plurality of input values may include a first plurality of boundary points 114 within the one or more reference images or videos. The first plurality of boundary points 114 may encompass the first object 112 in one or more reference FOVs (depicted by the first FOV 110a in FIG. 1) of the electronic device 106 at the first location 108a. In accordance with an embodiment, the image-processing engine 210 may be configured to determine a second location (depicted by the second location 108b in FIG. 1) and a target FOV (depicted by the second FOV 110b in FIG. 1). The second location 108b and the second FOV 110b may be determined to capture one or more final images or videos that comprise at least the first object 112, based on the received first plurality of boundary points 114.

In accordance with an embodiment, the one or more sensors 216 may generate sensor data when the one or more reference images or videos are captured. The image-processing engine 210 may receive the sensor data from the one or more sensors 216. The sensor data may include, but is not limited to, image-capturing sensor data, location sensor data, orientation sensor data, and/or velocity/motion sensor data. Thereafter, the image-processing engine 210 may determine one or more parameters based on the sensor data. Examples of the one or more parameters may include, but are not limited to, a direction of light, one or more sources of light, an intensity of light, an angle of movement of the electronic device 106 when the first object 112 is viewed in the first FOV 110a, a distance of the first object 112 from the electronic device 106 at the first location 108a, and/or an image quality threshold value. In accordance with an embodiment, the determination of the second location 108b and the second FOV 110b may be further based on the determined one or more parameters.

In accordance with an embodiment, the image-processing engine 210 may be configured to determine the first plurality of boundary points 114 that encompass the first object 112, based on the one or more parameters and/or the sensor data. In such a case, the image-processing engine 210 may not require the receipt of the first plurality of input values from the user 104. Alternatively, the UI manager 214 may present the one or more reference images or videos overlaid with the first plurality of boundary points 114 determined by the image-processing engine 210. The one or more reference images or videos overlaid with the first plurality of boundary points 114 may be presented to the user 104, via the first UI 120a of the electronic device 106. The user 104 may confirm or adjust the first plurality of boundary points 114, via the first UI 120a.

The image-processing engine 210 may be configured to determine whether the first object 112 lies completely or partially within the first FOV 110a, based on the one or more parameters and/or the sensor data. In case the first object 112 does not lie completely within the first FOV 110a, the UI manager 214 may prompt the user 104 to provide a threshold value associated with the capture of a portion of the first object 112. The image-processing engine 210 may determine the second location 108b and the second FOV 110b, based on the user defined threshold value. For example, the user 104 provides a threshold value, such as "120 percent", via the first UI 120a. Based on the threshold value, the image-processing engine 210 may determine a percentage of the captured image or video with respect to the background scene. Thus, based on the threshold value, "120 percent", the second FOV 110b includes "20 percent" more of the background scene.

In accordance with an embodiment, the image-processing engine 210 may be configured to receive a second plurality of input values from the user 104, via the first UI 120a, at the first location 108a. The received second plurality of input values may comprise the second plurality of boundary points 118, which may encompass the second object 116. In accordance with an embodiment, the image-processing engine 210 may be configured to determine the second location 108b and the second FOV 110b to capture a final image or video that may include both the first object 112 and the second object 116. The determination of the final image or video may be based on the received first plurality of boundary points 114 for the first object 112 and the received second plurality of boundary points 118 for the second object 116.

In accordance with an embodiment, the image-processing engine 210 may be configured to determine a threshold value to capture the image or video that includes a portion of the first object 112 and/or the second object 116 in the second FOV 110b. The image-processing engine 210 may determine the threshold value based on the one or more parameters and/or the sensor data. The UI manager 214 may present the threshold value to the user 104, via the first UI 120a. For example, the threshold values determined for the first object 112 and the second object 116 are, "100 percent" and "120 percent", respectively. This may indicate that the final image or video captured in the second FOV 110b may encompass, "100 percent" of the first object 112, and "120 percent" of the second object 116 with respect to the background scene.

In accordance with an embodiment, the first object 112, and/or the second object 116, may be in motion. The image-processing engine 210 may be configured to determine whether the first object 112 and/or the second object 116 is/are in motion, based on the sensor data and/or the one or more parameters. The image-processing engine 210 and/or the recommendation engine 212 may then generate a recommendation of one or more image-capture modes suitable to capture the first object 112 and/or the second object 116. The UI manager 214 may present the recommended image-capture mode to the user 104, via the second UI 120b of the electronic device 106. Examples of the one or more image-capture modes may include, but are not limited to, a full-resolution image-mode, a threshold-resolution image-mode, a panoramic image-mode, and/or a video mode. In accordance with an embodiment, the image-capture mode recommended to the user 104 may correspond to a video mode, when the first object 112 and/or the second object 116 is/are in motion.

In accordance with an embodiment, the recommendation engine 212 may be configured to generate one or more recommendations to assist the user 104 to capture an image or video of one or more objects, such as the first object 112, in the geographical area of the scene-of-interest 102. In accordance with an embodiment, the recommendation engine 212 may receive the sensor data from the one or more sensors 216 in real time. Thereafter, the recommendation engine 212 may determine one or more paths between a current location, such as the first location 108a, of the user 104 (such as that of the electronic device 106) within the geographical area and the second location 108b, based on the sensor data. For example, the recommendation engine 212 may receive location coordinates of the second location 108b from the image-processing engine 210. Further, the recommendation engine 212 may receive location coordinates of the current location of the user 104 (such as that of the electronic device 106) from the one or more sensors 216, such as the location sensor. Thereafter, the recommendation engine 212 may determine the one or more paths between the current location and the second location 108b, based on the respective location coordinates of the two locations. In accordance with an embodiment, the recommendation engine 212 may be configured to control a display of an indicator (hereinafter interchangeably referred as "guidance indicator") to guide the user 104 to the second location 108b, based on the determined one or more paths. The guidance indicator may enable the capture of the image or video of the one or more objects (such as the first object 112) in the second FOV 110b. The UI manager 214 may present the guidance indicator controlled by the recommendation engine 212, to user 104, via the second UI 120b. For example, a path between the current location of the user 104 and the second location 108b may require the user 104 to move, "3 feet to the right" and "6 feet backwards". The guidance indicator may direct the user 104 to move accordingly. The one or more sensors 216 may monitor the location of the user 104 (and the electronic device 106) as the user 104 moves towards the second location 108b in real time. The recommendation engine 212 may determine an updated path to the second location 108b, as the user 104 moves towards the second location 108b, based on the monitored location of the user 104. The guidance indicator may be accordingly updated. For instance, if the user 104 has moved "3 feet to the right" and "5 feet backwards" from the previous location of the user 104, the guidance indicator may direct the user 104 to further move, "1 foot backwards" to reach the second location 108b.

In accordance with an embodiment, the recommendation engine 212 may be configured to receive location coordinates of one or more other second locations in the geographical area from the image-processing engine 210. The one or more other second locations may correspond to the other optimum locations, in addition to the second location 108b, to capture the image or video of the one or more objects, such as the first object 112. In accordance with an embodiment, the recommendation engine 212 may be configured to determine one or more paths between the current location of the user 104 and each of the one or more other second locations. The UI manager 214 may present a recommendation of the one or more other second locations and/or the one or more paths determined between the current location and each of the one or more other second locations, to the user 104, via the second UI 120b. The UI manager 214 may prompt the user 104 to choose between one of the one or more other second locations and/or the second location 108b. The recommendation engine 212 may update the guidance indicator based on the location selected by the user 104 and the current location of the user 104 in real time. For instance, the best location to capture the image or video of the first object 112 (such as the second location 108b) may be unreachable for the user 104. In such a scenario, the user 104 may choose one of the other second locations recommended to capture the image or video of the first object 112. The guidance indicator may assist the user 104 to reach the other second location selected by the user 104.

In accordance with an embodiment, the recommendation engine 212 may be further configured to determine one or more setting parameters to capture the image or video of the one or more objects (such as the first object 112) at the determined second location 108b in the second FOV 110b. The recommendation engine 212 may determine the one or more setting parameters, based on the one or more parameters determined by the image-processing engine 210 and/or the sensor data. The one or more setting parameters may be used to configure one or more functionalities and/or operational aspects of an image-capturing sensor from the one or more sensors 216. The UI manager 214 may provide the determined one or more setting parameters as a recommendation to the user 104, via the second UI 120b of the electronic device 106. The user 104 may provide an input based on the recommended one or more setting parameters, via the second UI 120b. The one or more sensors 216, such as the image-capturing sensor, may adjust values of their setting parameters based on the user-input received for the respective setting parameters. Examples of the one or more setting parameters may include, but are not limited to, aperture settings, ISO sensitivity, auto-exposure, auto-focus, auto-white-balance, and/or auto-illumination. A person with ordinary skill in the art will understand that the scope of the disclosure should not be limited to the determination of the one or more setting parameters by the recommendation engine 212. In accordance with an embodiment, the image-processing engine 210 may be configured to determine the one or more setting parameters without deviation from the scope of the disclosure.

Various embodiments of the disclosure may encompass numerous advantages. As discussed above, the electronic device 106 may determine the second location 108b and the second FOV 110b that may be suitable to capture an image or video of the first object 112. The image or video of the first object 112 that is captured at the second location 108b may have a better quality than an image or video of the first object 112 that is captured at the first location 108a. This may be due to the second location 108b being more suitable as compared to the first location 108a, for capture of the image or video, based on the one or more parameters.

Further, as discussed, the electronic device 106 may provide guidance to the user 104 to find the second location 108b from the current location of the user 104. The user 104 may be reach the second location 108b by use of real-time directions. Further, in case the user 104 is unable to find the second location 108b, the electronic device 106 may provide the user 104 with alternate recommendations for second locations, for capture of the image or video of the first object 112. In addition, the electronic device 106 may provide the user 104 with recommendations of the one or more setting parameters, for proper configuration of the image-capturing sensors of the electronic device 106.

Figure 3:
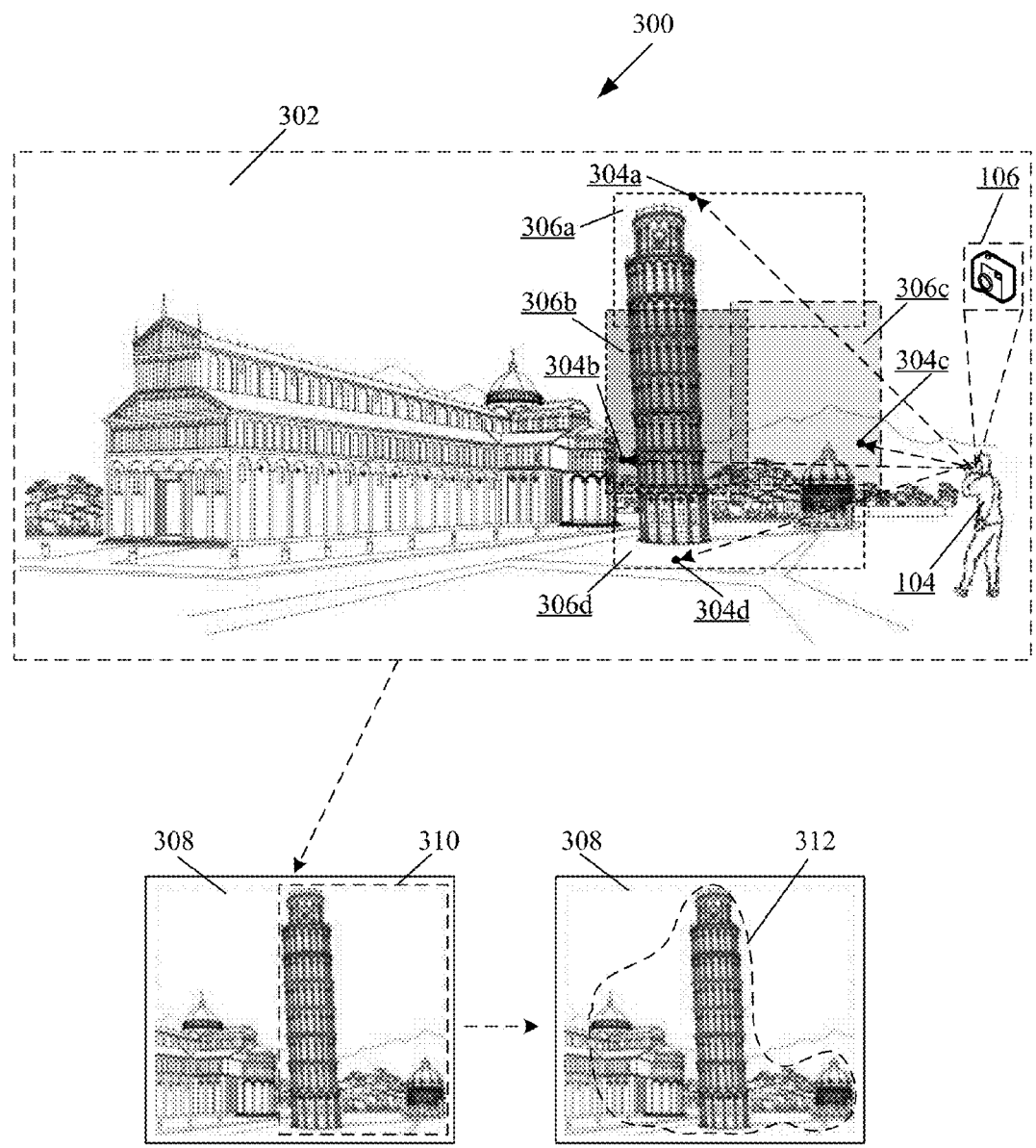
FIG. 3 illustrates an exemplary scenario for selection of a plurality of boundary points that encompass one or more objects of a scene-of-interest, in accordance with an embodiment of the disclosure.

FIG. 3 illustrates an exemplary scenario for selection of a plurality of boundary points that encompass one or more objects of a scene-of-interest, in accordance with an embodiment of the disclosure. FIG. 3 is described in conjunction with elements from FIG. 2. With reference to FIG. 3, there is shown a scenario diagram 300. The scenario diagram 300 comprises the user 104, the electronic device 106, a scene-of-interest 302, a top boundary point 304a, a left boundary point 304b, a right boundary point 304c, a bottom boundary point 304d, a top reference image 306a, a left reference image 306b, a right reference image 306c, a bottom reference image 306d, a target reference image 308, a first set of boundary points 310, and a second set of boundary points 312.

In operation, the UI manager 214 of the electronic device 106 may prompt the user 104 to capture one or more reference images that encompass one or more objects of interest in the scene-of-interest 302, via the first UI 120a. The user 104 may use the electronic device 106 to capture the top reference image 306a that may include a top portion of the one or more objects of interest in the scene-of-interest 302. Similarly, the user 104 may capture the left reference image 306b and the right reference image 306c, which may include a left portion and a right portion of the one or more objects of interest, respectively, by use of the electronic device 106. Further, the user 104 may capture the bottom reference image 306d that may include a bottom portion of the one or more objects of interest, by use of the electronic device 106. The image-processing engine 210 of the electronic device 106 may determine the top boundary point 304a, based on the sensor data received from the one or more sensors 216 of the electronic device 106, when the top reference image 306a is captured. Further, the image-processing engine 210 may determine the boundary points 304b, 304c, and 304d, based on the sensor data received from the one or more sensors 216, when the references images 306b, 306c, and 306d, respectively, are captured.

For example, the location sensors may determine the X, Y, and Z axes coordinates of the electronic device 106, when each of the reference images, such as 306a to 306d, is captured by the electronic device 106. Further, the orientation sensors may determine the angle of orientation of the electronic device 106, when each of the reference images, such as 306a to 306d, is captured by the electronic device 106. The image-processing engine 210 may apply one or more trigonometric estimations to determine distances of the one or more objects of interest from the electronic device 106. Further, the image-processing engine 210 may determine dimensions of the one or more objects of interest within the scene-of-interest 302, based on the one or more trigonometric estimations.

A person with ordinary skill in the art will understand that the scope of the disclosure should not be limited to the capture of the reference images, such as 306a to 306d, to determine the four boundary points, such as 304a, 304b, 304c, and 304d. In accordance with an embodiment, the user 104 may use the electronic device 106 to scan a vertical extent and a horizontal extent of the one or more objects of interest in the scene-of-interest 302. For instance, the user 104 may move the electronic device 106 to capture a continuous image or video of the vertical extent of the one or more objects of interest, from top to bottom, or vice versa. Similarly, the user 104 may move the electronic device 106 from left-to-right, or vice versa, to capture a continuous image or video of the horizontal extent of the one or more objects of interest. The image-processing engine 210 may determine the top and the bottom boundary points, 304a and 304d respectively, based on the continuous image or video of the vertical extent of the one or more objects of interest.

Further, the image-processing engine 210 may determine the left and the right boundary points, 304b and 304c respectively, based on the continuous image or video of the horizontal extent of the one or more objects of interest. In accordance with another embodiment, the user 104 may use the electronic device 106 to capture continuous images or videos of one or more diagonal extents of the one or more objects of interest. The image-processing engine 210 may determine the four boundary points, such as 304a to 304d, based on such continuous images or videos of the one or more diagonal extents.

In accordance with an embodiment, the image-processing engine 210 may generate the target reference image 308 by the combination of the images that may be captured to determine the four boundary points, 304a to 304d. Examples of images combined to generate the target reference image 308 may include, but are not limited to, the reference images 306a to 306d; and/or the images that include a scan of a vertical, horizontal, and/or one or more diagonal extents of the one or more objects of interest. The image-processing engine 210 may determine the first set of boundary points 310 that may encompass the one or more objects of interest based on the four boundary points 304a to 304d and/or the sensor data. Further, the UI manager 214 may present the first set of boundary points 310 overlaid on the target reference image 308, to the user 104, via the first UI 120a of the electronic device 106. In accordance with an embodiment, the user 104 may provide an input to modify the first set of boundary points 310 to the second set of boundary points 312. For instance, the user 104 may pinch, zoom, or pan on a touch screen of the electronic device 106, to modify the first set of boundary points 310 to the second set of boundary points 312. In accordance with an embodiment, the image-processing engine 210 may determine a target location and a target FOV that may be suitable to capture a final image or video that encompasses the one or more objects within the second set of boundary points 312.

Figure 4:
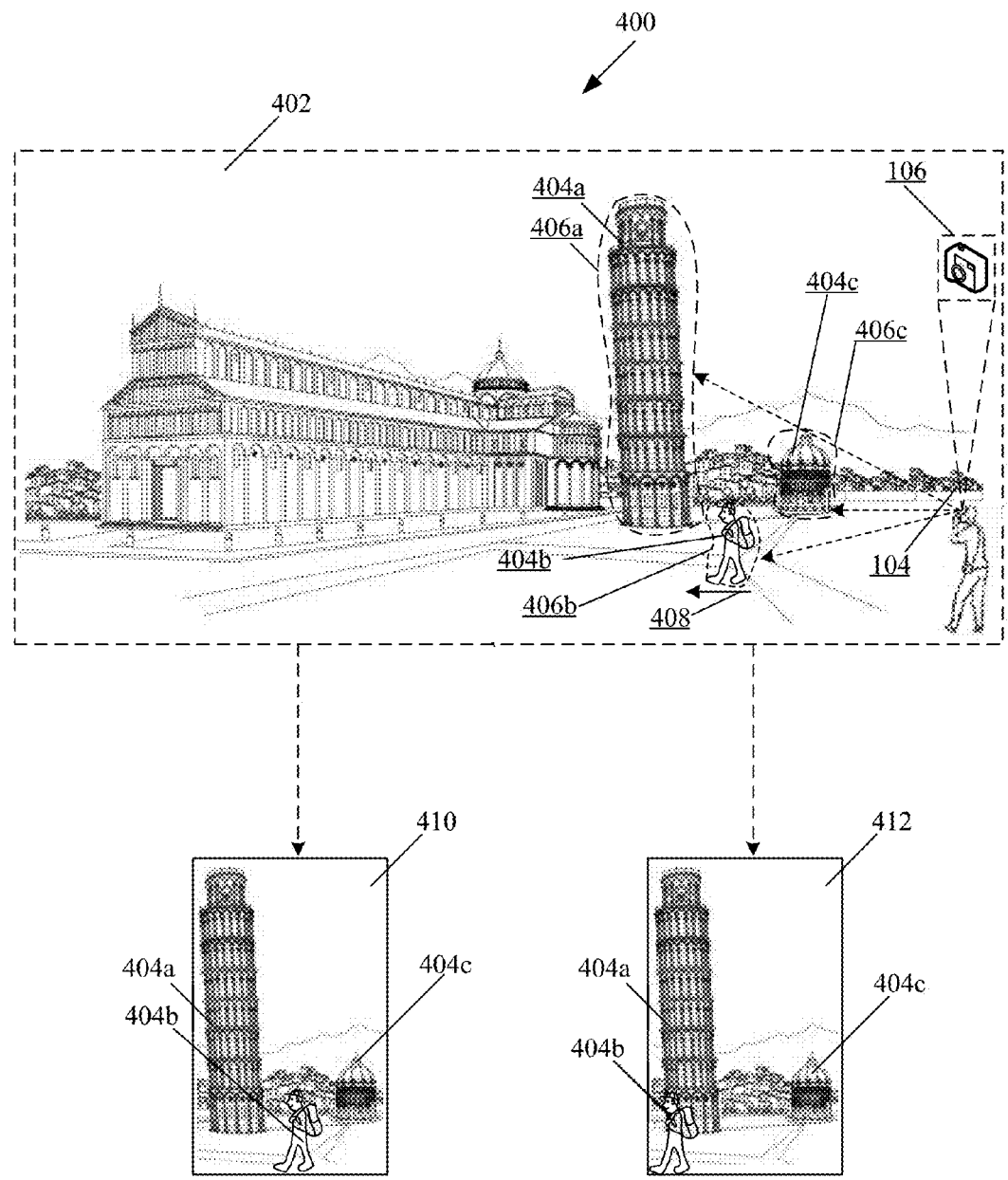
FIG. 4 illustrates an exemplary scenario for selection of a plurality of boundary points for at least one dynamic object and one or more static objects in a scene-of-interest, in accordance with an embodiment of the disclosure.

FIG. 4 illustrates an exemplary scenario for selection of a plurality of boundary points for at least one dynamic object and one or more static objects in a scene-of-interest, in accordance with an embodiment of the disclosure. FIG. 4 is described in conjunction with elements from FIG. 2. With reference to FIG. 4, there is shown a scenario diagram 400. The scenario diagram 400 comprises the user 104, the electronic device 106, a scene-of-interest 402, a first object 404a, a second object 404b, a third object 404c, a first plurality of boundary points 406a, a second plurality of boundary points 406b, a third plurality of boundary points 406c, a direction vector 408, a first image 410, and a second image 412.

In operation, the user 104 may use the electronic device 106 to capture one or more reference images or videos of one or more objects of interest in the scene-of-interest 402. For instance, the user 104 may capture one or more reference images or videos, which may encompass the first object 404a, the second object 404b, and the third object 404c. The UI manager 214 may prompt the user 104 to provide an input indicative of a plurality of boundary points that encompass each of the one or more objects of interest captured in the one or more reference images or videos, via the first UI 120a. The user 104 may provide the input indicative of such plurality of boundary points, based on the captured one or more reference images or videos. For instance, the user 104 may select the first plurality of boundary points 406a as the plurality of boundary points that encompass the first object 404a. Further, the user 104 may select the second plurality of boundary points 406b and the third plurality of boundary points 406c for the second object 404b and the third object 404c, respectively. In accordance with another embodiment, the image-processing engine 210 may determine the plurality of boundary points that encompass the one or more objects of interest, based on the sensor data and/or the one or more parameters. In such a case, the selection of the plurality of the boundary points may be performed without user input. Alternatively, the user 104 may provide input to confirm or modify the plurality of boundary points determined by the image-processing engine 210.

In accordance with an embodiment, at least one of the one or more objects of interest may be in motion while the other objects of interest may be stationary. For example, the second object 404b may correspond to a human subject, who may be in motion. The second object 404b may move in the direction 408, such as, from right-to-left across the scene-of-interest 402. Further, the first object 404a and the third object 404c may correspond to buildings or artefacts that are static. In accordance with an embodiment, the image-processing engine 210 may determine a target location and a target FOV that may be suitable to capture an image or video that encompasses the one or more objects of interest, based on the plurality of boundary points, the sensor data, and/or the one or more parameters. The recommendation engine 212 may generate the guidance indicator, to be displayed via the second UI 120b to the user 104, to assist the user 104 to reach the determined location.

For example, the guidance indicator may provide a recommendation to the user 104 to move to a particular location to capture the first image 410, which may encompass the first object 404a, the second object 404b, and the third object 404c. In a scenario where the user 104 is unable to move to that location, the guidance indicator may recommend another suitable location to capture the first image 410. Further, one or more sensors 216 may monitor the change in position of the one or more objects of interest and update the sensor data in real time. Alternatively, or in addition to the above, the user 104 may provide input to identify an object as a main object (e.g., the second object 404b), which may be in motion within the scene-of-interest 402. In accordance with an embodiment, the UI manager 214 may notify the user 104, via the second UI 120b, when an object of interest (such as the main object, such as the second object 404b), moves. In accordance with an embodiment, the image-processing engine 210 may determine a target location and an associated FOV that may be suitable to capture a subsequent image or video of the one or more objects of interest.

For instance, the user 104 may reach a particular location at a first time instance, to capture the first image 410, with the assistance of the guidance indicator. The first image 410 may include at least one dynamic object, such as the second object 404b. The one or more sensors 216 may detect the movement of the second object 404b. Thereafter, the guidance indicator may assist the user 104 to find a target location that may be suitable to capture a final image of the second object 404b. The user 104 may reach the target location with the assistance of the guidance indicator, to capture the final image, such as the second image 412, by use of the electronic device 106. As is evident, the second object 404b may move towards the left (in the direction depicted by 408) in the scene-of-interest 402, in a time interval between the capture of the first image 410 and the second image 412.

In accordance with an embodiment, the recommendation engine 212 may provide a recommendation of one or more image-capturing modes, to the user 104, via the second UI 120b. In accordance with an embodiment, the recommendation engine 212 may recommend a video mode or a panoramic image-mode, when one of the objects of interest may be in motion and the other objects of interest (static objects) may not be completely captured in a single image. The user 104 may capture a video that encompasses one or more static objects, such as the first object 404a and third object the 404c, and at least one dynamic object, such as the second object 404b, based on the recommendation. For instance, the first image 410 and the second image 412 may correspond to subsequent frames of the captured video.

In accordance with an embodiment, the recommendation engine 212 may also recommend a threshold image-mode, which may enable the capture of the dynamic object along with at least a predetermined portion of each of the other objects of interest. In such a scenario, the image-processing engine 210 may determine a location and a FOV that may be suitable to capture an image in the threshold image-mode. The guidance indicator may assist the user 104 to find such a location.

Figure 5:
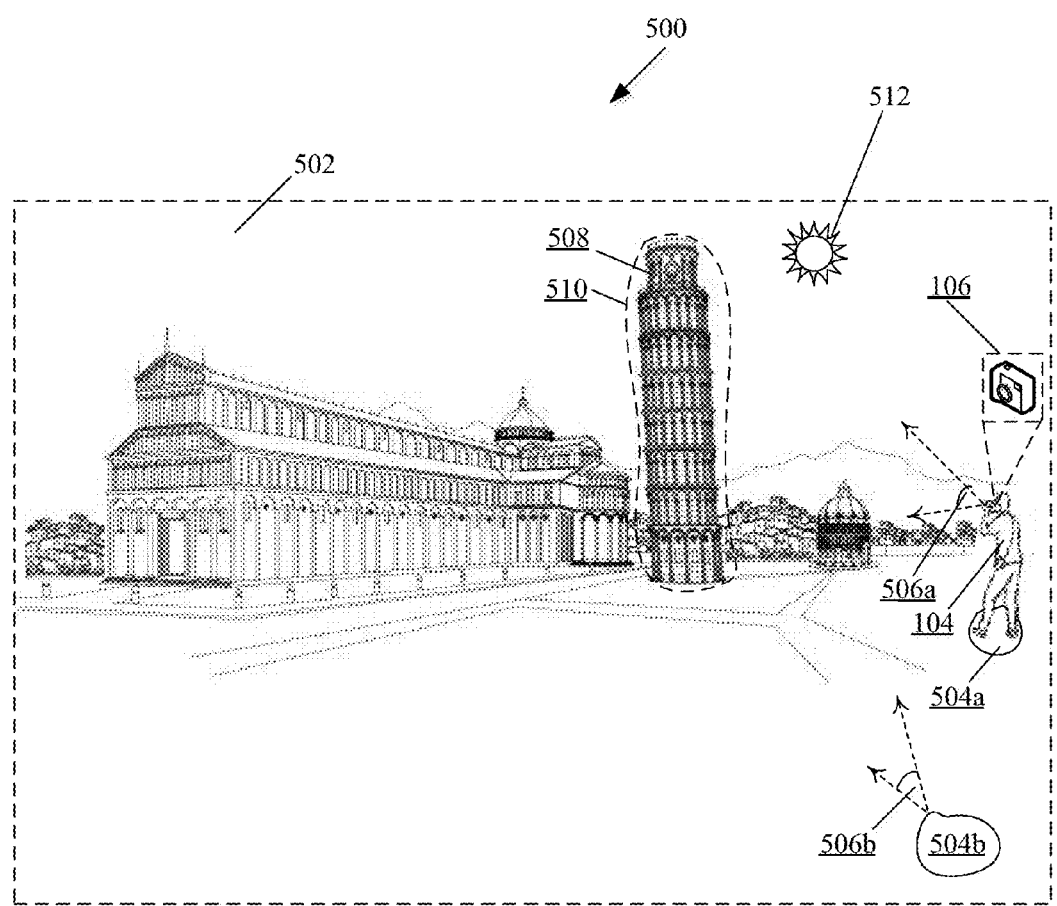
FIG. 5 illustrates a first exemplary scenario to assist a user in the capture of an image or video by use of an electronic device, in accordance with an embodiment of the disclosure.

FIG. 5 illustrates a first exemplary scenario to assist a user in the capture of an image or video by use of an electronic device, in accordance with an embodiment of the disclosure. FIG. 5 is described in conjunction with elements from FIG. 2. With reference to FIG. 5, there is shown a scenario diagram 500. The scenario diagram 500 comprises the user 104, the electronic device 106, a scene-of-interest 502, a current location 504a, a target location 504b, one or more FOVs of the electronic device 106 (depicted by a current FOV 506a), a target FOV of the electronic device 106 (depicted by a target FOV 506b), a first object 508, a first plurality of boundary points 512 that encompass the first object 508, and a light source 512 (such as the sun).

In operation, the user 104 may capture one or more reference images or videos of the first object 508, when the user 104 is located at the current location 504a. The UI manager 214 of the electronic device 106 may prompt the user 104 to provide a first plurality of input values, via the first UI 120a, based on the captured one or more reference images or videos. The user 104 may provide the first plurality of input values, via the first UI 120a of the electronic device 106. In accordance with an embodiment, the first plurality of input values provided by the user 104 may include an indication of the first plurality of boundary points 510 that encompass the first object 508 within the current FOV 506a.

In accordance with an embodiment, the one or more sensors 216 of the electronic device 106, may be configured to determine the sensor data and the one or more parameters. For instance, a light sensor from the one or more sensors 216 may determine a direction and intensity of light emitted from the light source 512. Further, the light sensor may determine whether the scene-of-interest 502 includes other light sources in addition to the light source 512. In a similar manner, the light sensor may determine the direction and intensity of light emitted from all such light sources. In addition, the light sensor may also determine whether the scene-of-interest 502 includes one or more regions of shadow. Accordingly, the image-processing engine 210 may determine the target location 504b and the target FOV 506b for the electronic device 106, based on the sensor data and the one or more parameters determined by the one or more sensors 216, such as the light sensor. The recommendation engine 212 may control the guidance indicator displayed on the second UI 120b, to assist the user 104 to find the target location 504b, to capture a final image or video of the first object 508 in the target FOV 506b.

For example, the light source 512 may be bright and the direction of light emitted by the light source 512 may be within the current FOV 506a. In such a case, the image-processing engine 210 may determine the target location 504b as a location that is subject to a lower intensity of light from the light source 512. Further, the image-processing engine 210 may determine the target FOV 506b as an FOV that may encompass an area away from the direction of light emitted by the light source 512. In another scenario, the light source 512 may not be very bright and the scene-of-interest 502 may be a dim light scene. In such a case, the image-processing engine 210 may determine the second location 504b as a location with a good lighting condition. Further, the image-processing engine 210 may generate a recommendation for use of a flash to effectively capture an image or video of the first object 508 at the second location 504b. A person with ordinary skill in the art will understand that presence of high intensity light sources and shadow regions within a FOV may degrade the quality of images or videos captured in that FOV due to a high dynamic range and contrast in the captured images or videos. On the other hand, low light conditions within a FOV may also degrade the quality of images of videos captured in the FOV due to a low dynamic range and contrast in the captured images or videos. Thus, a recommendation generated by the image-processing engine 210 to capture the final image or video of the first object 508 at the second location 504b, may assist the user 104 to capture an optimal shot under improper lighting conditions.

Figure 6:
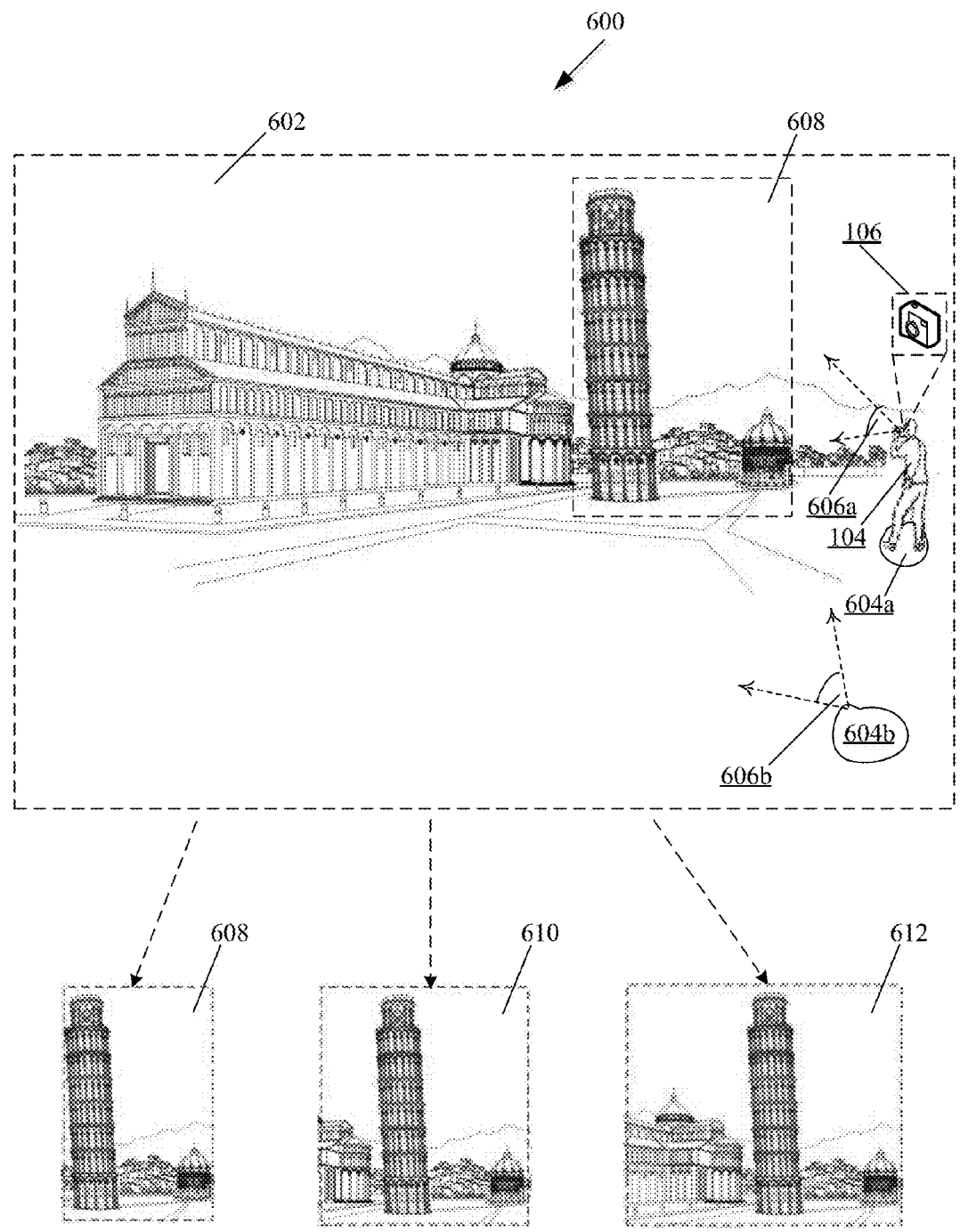
FIG. 6 illustrates a second exemplary scenario to assist a user in the capture of an image or video by use of an electronic device, in accordance with an embodiment of the disclosure.

FIG. 6 illustrates a second exemplary scenario to assist a user in the capture of an image or video by use of an electronic device, in accordance with an embodiment of the disclosure. FIG. 6 is described in conjunction with elements from FIG. 2. With reference to FIG. 6, there is shown a scenario diagram 600. The scenario diagram 600 comprises the user 104, the electronic device 106, a scene-of-interest 602, a current location 604a, a target location 604b, one or more FOVs of the electronic device 106, such as a current FOV 606a and a target FOV 606b of the electronic device 106, a reference image 608, a first threshold image 610, and a second threshold image 612.

In operation, the user 104 may capture the reference image 608 at the current location 604a, by use of the electronic device 106. In accordance with an embodiment, the reference image 608 may be captured within the current FOV 606a of the electronic device 106, at the current location 604a. The UI manager 214 may prompt the user 104 to provide a threshold value related to the capture of an image or video, based on the reference image 608, via the first UI 120a. In accordance with an embodiment, the threshold value may correspond to a ratio of a background in the reference image 608 to a background in an image or video to be captured. The user 104 may then provide an input indicative of the threshold value, via the first UI 120a.

In accordance with an embodiment, the image-processing engine 210 may receive the sensor data from the one or more sensors 216. Further, the image-processing engine 210 may determine one or more parameters, based on the sensor data. Examples of the one or more parameters may include, but are not limited to, a direction of light, one or more sources of light, an intensity of light, an angle of movement of the electronic device 106 when an object is viewed in the current FOV 606a, a distance of the object from the electronic device 106 at the current location 604a, and/or an image quality threshold value. The image-processing engine 210 may determine the target location 604b and the target FOV 606b, based on the one or more parameters and the threshold value provided by the user 104. In accordance with an embodiment, the recommendation engine 212 may control the guidance indicator displayed on the second UI 120b, to assist the user 104 to find the target location 604b, to capture a threshold image or video in the target FOV 606b.

For example, the reference image 608 may correspond to a threshold value, such as "100 percent". On the other hand, the first threshold image 610 and the second threshold image 612 may correspond to threshold values, such as "120 percent" and "150 percent", respectively. Thus, the first threshold image 610 may include "20 percent" additional background with respect to the reference image 608. Similarly, the second threshold image 612 may include "50 percent" additional background with respect to the reference image 608. In a scenario where the user 104 provides a threshold value, such as "120 percent", the guidance indicator may guide the user 104 to the target location 604b suitable to capture the first threshold image 610 in the associated target FOV 606b of the electronic device 106. Similarly, if the user 104 provides a threshold value, such as "150 percent", the user 104 may be guided to the target location 604b, which may be suitable to capture the second threshold image 612 in the associated target FOV 606b of the electronic device 106.

Figure 7:
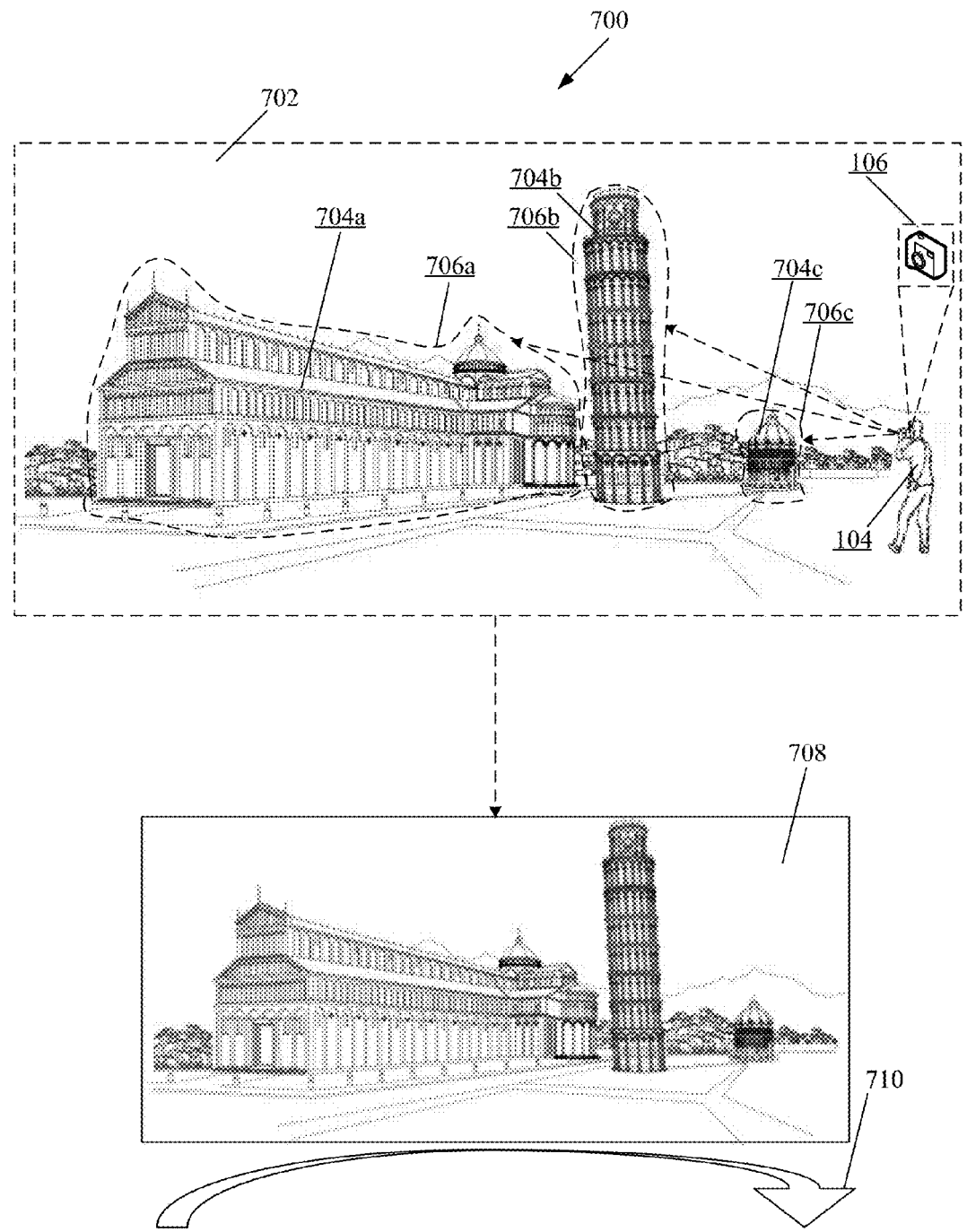
FIG. 7 illustrates an exemplary scenario for guidance of a user to capture a panoramic image of a scene-of-interest, in accordance with an embodiment of the disclosure.

FIG. 7 illustrates an exemplary scenario for guidance of a user to capture a panoramic image of a scene-of-interest, in accordance with an embodiment of the disclosure. FIG. 7 is described in conjunction with elements from FIG. 2. With reference to FIG. 7, there is shown a scenario diagram 700. The scenario diagram 700 comprises the user 104, the electronic device 106, a scene-of-interest 702, a first object 704a, a second object 704b, a third object 704c, a first plurality of boundary points 706a, a second plurality of boundary points 706b, a third plurality of boundary points 706c, a panoramic image 708, and a scan direction 710.

In operation, the user 104 may use the electronic device 106 to capture one or more reference images or videos of one or more objects of interest in the scene-of-interest 702. The UI manager 214 may prompt the user 104 to provide an input indicative of a plurality of boundary points that encompass each of the one or more objects of interest captured in the one or more reference images or videos, via the first UI 120a. The user 104 may provide the input indicative of such plurality of boundary points, based on the captured one or more reference images or videos. For instance, the user 104 may select the first plurality of boundary points 706a as the plurality of boundary points that encompass the first object 704a. Further, the user 104 may select the second plurality of boundary points 706b and the third plurality of boundary points 706c for the second object 704b and the third object 704c, respectively. In accordance with another embodiment, the image-processing engine 210 may determine the plurality of boundary points that encompass the one or more objects of interest, based on the sensor data and/or the one or more parameters. In such a case, the selection of the plurality of the boundary points may be performed without any user input. Alternatively, the user 104 may provide an input to confirm or modify the plurality of boundary points determined by the image-processing engine 210.

In accordance with an embodiment, the image-processing engine 210 may determine one or more locations and associated target FOVs, based on the sensor data, the one or more parameters, and/or the plurality of boundary points of each object of interest, such as 706a, 706b, and 706c. The one or more locations may be suitable to capture an image or video that encompasses the objects 704a, 704b, and 704c within the associated target FOVs. Further, the image-processing engine 210 may determine whether each of the one or more objects of interest may be encompassed in a single image captured at the one or more locations. The image-processing engine 210, or the recommendation engine 212, may generate a recommendation to capture an image in a panorama image-mode, when a single image may not include all objects of interest in their entirety. The UI manager 214 may indicate such a recommendation to the user 104, via the second UI 120b. Thereafter, the user 104 may capture the panoramic image 708, by use of the electronic device 106, based on the recommendation. In accordance with an embodiment, the user 104 may capture the panoramic image 708 by the capture of a horizontal extent of the scene-of-interest 702 from left-to-right (as indicated by the scan direction 710), or vice versa. The horizontal extent captured from the scene-of-interest 702 in the panoramic image 708 may include each object of interest, such as 704a to 704c.

Figure 8:
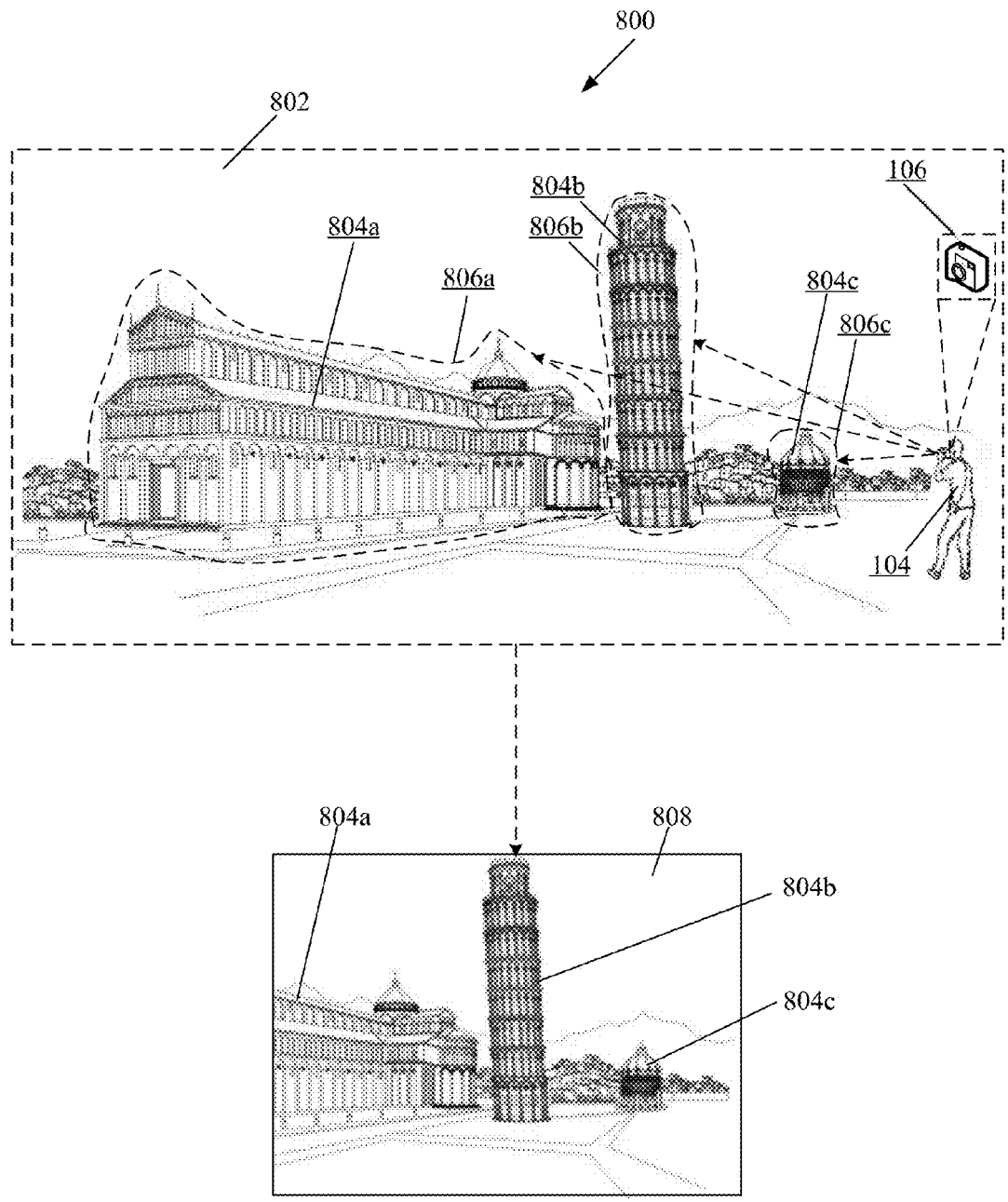
FIG. 8 illustrates an exemplary scenario for guidance of a user to capture a threshold image of a scene-of-interest, in accordance with an embodiment of the disclosure.

FIG. 8 illustrates an exemplary scenario for guidance of a user to capture a threshold image of a scene-of-interest, in accordance with an embodiment of the disclosure. FIG. 8 is described in conjunction with elements from FIG. 2. With reference to FIG. 8, there is shown a scenario diagram 800. The scenario diagram 800 comprises the user 104, the electronic device 106, a scene-of-interest 802, a first object 804a, a second object 804b, a third object 804c, a first plurality of boundary points 806a, a second plurality of boundary points 806b, a third plurality of boundary points 806c, and a threshold image 708.

In operation, the user 104 may use the electronic device 106 to capture one or more reference images or videos of one or more objects-of-interest in the scene-of-interest 802. The UI manager 214 may prompt the user 104 to provide an input indicative of a plurality of boundary points that encompass each of the one or more objects of interest captured in the one or more reference images or videos, via the first UI 120a. The user 104 may provide input indicative of such plurality of boundary points, based on the captured one or more reference images or videos. For instance, the user 104 may select the first plurality of boundary points 806a as the plurality of boundary points that encompass the first object 804a. Further, the user 104 may select the second plurality of boundary points 806b and the third plurality of boundary points 806c for the second object 804b and the third object 804c, respectively. In accordance with another embodiment, the image-processing engine 210 may determine the plurality of boundary points that encompass the one or more objects of interest, based on the sensor data and/or the one or more parameters. In such a case, the selection of the plurality of the boundary points may be performed without any user input. Alternatively, the user 104 may provide an input to confirm or modify the plurality of boundary points determined by the image-processing engine 210.

In accordance with an embodiment, the image-processing engine 210 may determine one or more locations and associated target FOVs, based on the sensor data, the one or more parameters, and/or the plurality of boundary points of each object of interest, such as 806a, 806b, and 806c. The one or more locations may be suitable to capture an image or video that encompasses the objects 804a, 804b, and 804c within the associated target FOVs. Further, the image-processing engine 210 may determine whether each of the one or more objects of interest may be fully encompassed in a single image captured at the one or more locations. The image-processing engine 210 or the recommendation engine 212 may generate a recommendation to capture an image in a threshold image-mode, when a single image may not encapsulate all objects of interest in their entirety. The UI manager 214 may indicate this recommendation to the user 104, via the second UI 120b. Thereafter, the user 104 may capture the threshold image 808 by use of the electronic device 106, based on the recommendation.

In accordance with an embodiment, the threshold image 808 may include a complete portion of a first set of objects and a predetermined portion of a second set of objects, from the one or more objects of interest in the scene-of-interest 802. For instance, the first set of objects in the threshold image 808 may include the second object 804b and the third object 804c. Further, the second set of objects may include the first object 808a. Thus, in this case, the threshold image 808 may include a complete portion of the objects 804b and 804c, and a predetermined portion, such as of the object 804a. In accordance with an embodiment, the user 104 may provide an input indicative of a threshold value that may correspond to a minimum portion of each object required to be included within the threshold image 808. For instance, the user 104 may provide a threshold value, such as "80 percent". In this case, the threshold image 808 may include at least "80 percent" portion of each object of interest. In accordance with another embodiment, the image-processing engine 210 may determine the threshold value, based on the sensor data and/or the one or more parameters. In an embodiment, the UI manager 214 may present the threshold value to the user 104, via the first UI 120a. The user 104 may confirm or modify the threshold value, based on the preference of the user 104.

A person with ordinary skill in the art will understand that the six exemplary scenarios, 300, 400, 500, 600, 700, and 800, have been provided for illustrative purposes and should not be construed to limit the scope of the disclosure. The disclosure may be implemented in various other scenarios with one or more variations, without departure from the scope of the disclosure.

Figure 9:
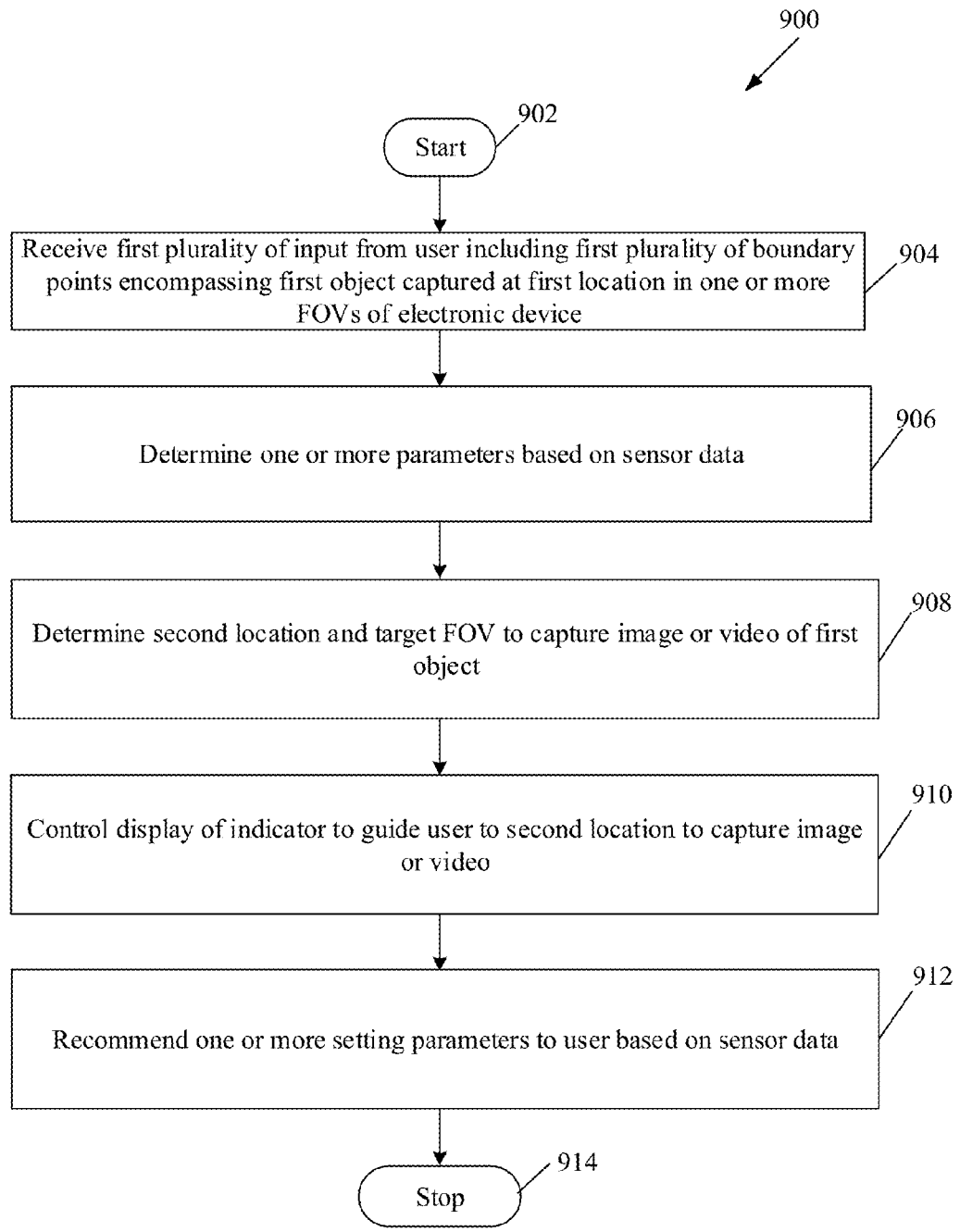
FIG. 9 is a flow chart that illustrates a method to assist a user to capture an image or video, in accordance with an embodiment of the disclosure.

FIG. 9 is a flow chart that illustrates a method to assist a user in the capture of an image or video, in accordance with an embodiment of the disclosure. With reference to FIG. 9, there is shown a flow chart 900. The flow chart 900 is described in conjunction with FIGS. 1 and 2. The method starts at step 902 and proceeds to step 904.

At step 904, a first plurality of input values may be received from the user 104. In accordance with an embodiment, the image-processing engine 210 of the electronic device 106 may be configured to receive the first plurality of input values, via the first UI 120a of the electronic device 106. In accordance with an embodiment, the first plurality of input values may include a first plurality of boundary points 114 (FIG. 1). The first plurality of boundary points 114 may encompass a first object 112 (FIG. 1) in one or more FOVs (depicted by the first FOV 110a) of the electronic device 106 at a first location (depicted by 108a in FIG. 1).

In accordance with an embodiment, the image-processing engine 210 may determine the first plurality of boundary points 114, based on sensor data generated by the one or more sensors 216 of the electronic device 106. In such a scenario, the first plurality of input values may not be required from the user 104, and hence, the step 904 may be skipped. Alternatively, the UI manager 214 may display the first plurality of boundary points 114 to the user 104, via the first UI 120a. The user 104 may confirm or modify the first plurality of boundary points 114.

At step 906, one or more parameters may be determined based on the sensor data. In accordance with an embodiment, the image-processing engine 210 may be configured to receive the sensor data from the one or more sensors 216. The sensor data may include, but is not limited to, image-capturing sensor data, location sensor data, orientation sensor data, and/or velocity/motion sensor data. The image-processing engine 210 may be configured to determine the one or more parameters based on the sensor data. Examples of the one or more parameters may include, but are not limited to, a direction of light, one or more sources of light, an intensity of light, an angle of movement of the electronic device 106 when the first object 112 is viewed in the first FOV 110a, a distance of the first object 112 from the electronic device 106 at the first location 108a, and/or an image quality threshold value.

At step 908, a second location (depicted by the second location 108b in FIG. 1) and a target FOV (depicted by the second FOV 110b in FIG. 1) of the electronic device 106 may be determined. In accordance with an embodiment, the image-processing engine 210 may be configured to determine the second location 108b and the second FOV 110b of the electronic device 106, based on the one or more parameters, the sensor data and/or the first plurality of boundary points 114. In accordance with an embodiment, the second location 108b may be a suitable location to capture an image or video that encompasses at least the first object 112 within the second FOV 110b. A person with ordinary skill in the art may understand that the image-processing engine 210 may determine multiple second locations and associated target FOVs to the image or video of the first object 112, without departure from the scope of the disclosure.

At step 910, a display of an indicator to guide the user 104 to the second location 108b may be controlled. In accordance with an embodiment, the recommendation engine 212 of the electronic device 106 may be configured to receive the sensor data from the one or more sensors 216, in real time. The sensor data may indicate a current location of the electronic device 106 (same as that of the user 104). The recommendation engine 212 may generate a recommendation of one or more paths to reach the second location 108b from the current location of the user 104. The UI manager 214 may present a guidance indicator, controlled by the recommendation engine 212, based on the generated recommendations, to the user 104, via the second UI 120b. The recommendation engine 212 may update the recommendations presented via the guidance indicator, based on the real-time movement of the user 104. Thus, the guidance indicator may assist the user 104 to reach the second location 108b to capture the final image or video of the first object 112 in the second FOV 110b. A person with ordinary skill in the art will understand that the guidance indicator may provide a recommendation of one or more paths to another second location, when the user 104 may be unable to reach the second location 108b.

At step 912, one or more setting parameters may be recommended to the user 104. In accordance with an embodiment, the recommendation engine 212 may be configured to recommend the one or more setting parameters, based on the sensor data. The one or more setting parameters may be used to configure one or more functionalities and/or operational aspects of an image-capturing sensor from the one or more sensors 216. The UI manager 214 may provide the determined one or more setting parameters as a recommendation to the user 104, via the second UI 120b of the electronic device 106. The user 104 may provide input based on the recommended one or more setting parameters, via the second UI 120b. The one or more sensors 216, such as the image-capturing sensor, may adjust values of their setting parameters, based on the user-input received for the respective setting parameters. Examples of the one or more setting parameters may include, but are not limited to, aperture setting, ISO sensitivity, auto-exposure, auto-focus, auto-white-balance, and/or auto-illumination. A person with ordinary skill in the art will understand that the scope of the disclosure should not be limited to the determination of the one or more setting parameters by the recommendation engine 212. In accordance with an embodiment, the image-processing engine 210 may be configured to determine the one or more setting parameters without deviation from the scope of the disclosure. Control passes to end step 914.

In accordance with an embodiment of the disclosure, a system to assist a user in the capture an image or video is disclosed. The system may comprise the electronic device 106 that may be configured to receive a first plurality of input values from the user at a first location. The received first plurality of input values may comprise a first plurality of boundary points that encompass a first object in one or more FOVs of the electronic device 106 at the first location. The electronic device 106 may be further configured to determine a second location and a target FOV to capture the image or video, based on the received first plurality of boundary points. The image or video may comprise at least the first object. Further, the electronic device 106 may control a display of an indicator to guide the user to the second location to capture the image or video of the first object in the target FOV.

Various embodiments of the disclosure may provide a non-transitory computer readable medium and/or storage medium having stored thereon, a machine code and/or a computer program having at least one code section executable by a machine and/or a computer to assist a user to capture an image or video. The at least one code section in the electronic device 106 may cause the machine and/or computer to perform the steps that comprise the reception of a first plurality of input values from the user at a first location. The received first plurality of input values may comprise a first plurality of boundary points that encompass a first object in one or more FOVs of the electronic device 106 at the first location. Thereafter, a second location and a target FOV to capture the image or video may be determined, based on the received first plurality of boundary points. The image or video may comprise at least the first object. Further, display of an indicator may be controlled to guide the user to the second location to capture the image or video of the first object in the target FOV.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A system, comprising:
   one or more circuits in an electronic device, said one or more circuits configured to:
      receive a first plurality of boundary points based on user input,
      wherein said received first plurality of boundary points encompass a first object in a first field-of-view (FOV) of said electronic device at a first location;
      determine a second location and a second FOV to capture an image or a video comprising at least said first object, wherein said second location and said second FOV are determined based on said received first plurality of boundary points; and
      control display of an indicator to guide a user to said second location to capture said image or said video of said first object in said second FOV.

2. The system according to claim 1, wherein a portion of said first object extends beyond said first FOV of said electronic device at said first location.

3. The system according to claim 1, wherein said one or more circuits are further configured to:
   receive sensor data from a plurality of sensors of said electronic device; and
   determine a plurality of parameters based on said received sensor data.

4. The system according to claim 3,
   wherein said one or more circuits are further configured to determine said second location and said second FOV based on said plurality of parameters,
   wherein said plurality of parameters comprise at least one of a direction of light, at least one source of light, an intensity of light, an angle of movement of said electronic device based on said first object in said first FOV, a distance of said first object from said electronic device at said first location, or an image quality threshold value.

5. The system according to claim 1, wherein said one or more circuits are further configured to determine said second location and said second FOV based on a user defined threshold value for capture of a portion of said first object in said second FOV.

6. The system according to claim 1, wherein said one or more circuits are further configured to receive a plurality of input values from said user at said first location,
   wherein said received plurality of input values comprise a second plurality of boundary points that encompass a second object.

7. The system according to claim 6, wherein said one or more circuits are further configured to determine said second location and said second FOV based on said received first plurality of boundary points and based on said second plurality of boundary points.

8. The system according to claim 6, wherein said one or more circuits are further configured to indicate a threshold value for capture of a portion of at least one of said first object or said second object in said second FOV.

9. The system according to claim 6, wherein at least one of said first object or said second object are in motion.

10. The system according to claim 9, wherein said one or more circuits are further configured to capture said video comprising said first object and said second object based on said motion of said at least one of said first object or said second object.

11. The system according to claim 1,
    wherein said one or more circuits are further configured to recommend usage of setting parameters for said capture of said image or said video of said first object at said second location in said second FOV,
    wherein said setting parameters comprise at least one of aperture setting, International Organization for Standardization (ISO) sensitivity, auto-exposure, auto-focus, auto-white-balance, or auto-illumination.

12. The system according to claim 1, wherein said displayed indicator includes navigation directions to said second location based on a real-time movement of said user.

13. A method, comprising:
    in an electronic device:
       receiving a first plurality of boundary points based on user input,
       wherein said received first plurality of boundary points encompass a first object in a first field-of-view (FOV) of said electronic device at a first location;
       determining a second location and a second FOV to capture an image or a video comprising at least said first object, wherein said second location and said second FOV are determined based on said received first plurality of boundary points; and
       controlling display of an indicator to guide a user to said second location to capture said image or said video of said first object in said second FOV.

14. The method according to claim 13, wherein a portion of said first object extends beyond said first FOV of said electronic device at said first location.

15. The method according to claim 13, further comprising:
    receiving sensor data from a plurality of sensors of said electronic device; and
    determining a plurality of parameters based on said received sensor data.

16. The method according to claim 15, further comprising determining said second location and said second FOV based on said plurality of parameters,
    wherein said plurality of parameters comprise at least one of a direction of light, at least one source of light, an intensity of light, an angle of movement of said electronic device based on said first object in said first FOV, a distance of said first object from said electronic device at said first location, or an image quality threshold value.

17. The method according to claim 13, further comprising determining said second location and said second FOV based on a user defined threshold value of capturing a portion of said first object in said second FOV.

18. The method according to claim 13, further comprising receiving a plurality of input values from said user at said first location, wherein said received plurality of input values comprise a second plurality of boundary points encompassing a second object.

19. The method according to claim 18, further comprising recommending a panoramic-image mode to capture said first object and said second object.

20. The method according to claim 18, further comprising determining said second location and said second FOV to capture said image or said video based on said received first plurality of boundary points and based on said second plurality of boundary points.

21. The method according to claim 18, further comprising indicating a threshold value of capturing a portion of at least one of said first object or said second object in said second FOV.

22. The method according to claim 18, further comprising capturing said video comprising said first object and said second object based on motion of said at least one of said first object or said second object.

23. The method according to claim 13, further comprising recommending usage of setting parameters for capturing said image or said video of said first object at said second location in said second FOV, wherein said setting parameters comprise at least one of aperture setting, International Organization for Standardization (ISO) sensitivity, auto-exposure, auto-focus, auto-white-balance, or auto-illumination.

24. A non-transitory computer-readable medium having stored thereon computer-executable instructions which, when executed by a processor, cause an electronic device to execute operations, said operations comprising:
receiving a first plurality of boundary points based on user input,
wherein said received first plurality of boundary points encompass a first object in a first field-of-view (FOV) of said electronic device at a first location;
determining a second location and a second FOV to capture an image or a video comprising at least said first object, wherein said second location and said second FOV are determined based on said received first plurality of boundary points; and
controlling display of an indicator to guide a user to said second location to capture said image or said video of said first object in said second FOV.

* * * * *